United States Patent [19]

Esmay et al.

[11] 4,415,615
[45] Nov. 15, 1983

[54] CELLULAR PRESSURE-SENSITIVE ADHESIVE PRODUCT AND METHOD OF MAKING

[75] Inventors: Donald L. Esmay, Coon Rapids; Gordon G. Johnson, Lake Elmo, both of Minn.; George F. Vesley, Hudson, Wis.

[73] Assignee: Minnesota Mining and Manufacturing Co., St. Paul, Minn.

[21] Appl. No.: 383,582

[22] Filed: Jun. 1, 1982

Related U.S. Application Data

[63] Continuation-in-part of Ser. No. 339,405, Jan. 15, 1982.

[51] Int. Cl.³ .......... B32B 27/16; B32B 7/06; B32B 7/12; B32B 31/28
[52] U.S. Cl. .......... 428/40; 427/54.1; 427/208.2; 427/208.4; 428/214; 428/317.5; 428/349; 428/355
[58] Field of Search .......... 428/40, 906, 214, 313.9, 428/314.2, 314.4, 314.8, 315.5, 315.7, 315.9, 317.3, 317.5, 345, 346, 347, 349, 355, 317.1, 317.7; 427/54.1, 208.2, 208.4

[56] References Cited

U.S. PATENT DOCUMENTS

| | | | |
|---|---|---|---|
| 2,866,722 | 12/1958 | Gensel et al. | 428/355 |
| 2,956,904 | 10/1960 | Hendricks | 427/44 |
| 3,565,247 | 2/1971 | Brochman | 428/40 |
| 3,765,972 | 10/1973 | Wesp | 156/71 |
| 3,993,833 | 11/1976 | Esmay | 428/317.3 |
| 4,112,177 | 9/1978 | Salditt et al. | 428/317.3 |
| 4,163,822 | 8/1979 | Walter | 428/317.3 |
| 4,181,752 | 1/1980 | Martens | 427/54.1 |
| 4,223,067 | 9/1980 | Levens | 428/317.3 |
| 4,234,500 | 11/1980 | Hoeschele et al. | 260/429 R |
| 4,256,828 | 3/1981 | Smith | 430/280 |
| 4,265,965 | 5/1981 | Chancler | 428/314.2 |
| 4,303,485 | 12/1981 | Levens | 204/159.24 |
| 4,329,384 | 5/1982 | Vesley et al. | 428/40 |
| 4,329,386 | 5/1982 | Samowich | 428/196 |
| 4,330,590 | 5/1982 | Vesley | 428/336 |

FOREIGN PATENT DOCUMENTS

747341  11/1966  Canada .................. 428/40

Primary Examiner—William J. Van Balen
Attorney, Agent, or Firm—Donald M. Sell; James A. Smith; Richard E. Brink

[57] ABSTRACT

A cellular pressure-sensitive adhesive membrane comprising 15 to 85% voids that does not collapse after being briefly compressed, has remarkably good adhesion on contact with rough surfaces and remarkably good flexibility and conformability at sub-freezing temperatures.

14 Claims, 3 Drawing Figures

CELLULAR PRESSURE-SENSITIVE ADHESIVE PRODUCT AND METHOD OF MAKING

CROSS-REFERENCE TO RELATED APPLICATION

This is a continuation-in-part of applicant's copending application Ser. No. 339,405, filed Jan. 15, 1982.

TECHNICAL FIELD

The invention concerns a product including a pressure-sensitive adhesive layer which is a foam, i.e., a membrane having a cellular structure.

BACKGROUND ART

Foam-containing pressure-sensitive adhesive tapes are widely used for mounting objects such as pictures on walls or plastic body side molding on automobiles. Such a tape typically consists of a polyurethane, polychloroprene or polyethylene foam carrying a layer of pressure-sensitive adhesive on each face. For other uses, the adhesive layer may cover only one face, e.g., a tape useful as a cushioning gasket for an automobile window.

As disclosed in Canadian Pat. No. 747,341 (Engdahl, Buchholtz) and U.S. Pat. No. 3,993,833 (Esmay), a mixture can be foamed against a pressure-sensitive adhesive layer or between a pair of such layers. Alternatively the mixture may be foamed against a temporary carrier member which has a low-adhesion surface, followed by laminating one or two adhesive layers to the foam.

U.S. Pat. No. 3,565,247 (Brochman) concerns a pressure-sensitive adhesive tape, the adhesive layer of which is a foam, thus affording the economy of creating a tape in a unitary process, as opposed to the need to form the pressure-sensitive layer(s) separately when making foam-backed tapes. To make a tape of the Brochman patent, a blowing agent and a nucleating-reinforcing agent such as fumed silica are blended into a solution of a pressure-sensitive adhesive. After this blend is coated on a backing, it is heated to a temperature high enough to evaporate the solvent but not high enough to decompose the blowing agent. After the solvent has been evaporated, the temperature is increased to that necessary to decompose the blowing agent to release a gas which forms minute, generally spheroidal bubbles or microcells throughout the dried pressure-sensitive adhesive layer. Voids comprise 25 to 85% of the cellular adhesive layer. The Brochman patent reports that the cellular adhesive layer typically shows less than 5 percent recovery after being compressed to half its original thickness, the microcells collapsing under local high pressure.

DISCLOSURE OF THE INVENTION

Figure 1:
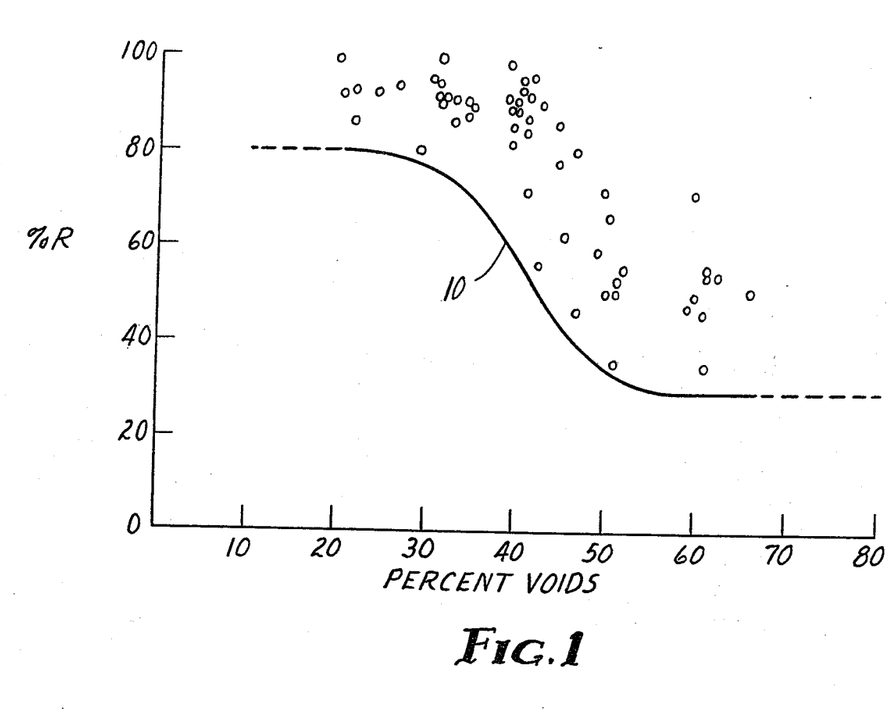
FIG. 1 shows the relationship of percent voids and percent recovery (%R) of cellular adhesive membranes of the invention after being compressed ⅔ of the voids thickness.

The product of the present invention is similar to tape of the Brochman patent, each having a backing carrying a layer of pressure-sensitive adhesive which is a foam, i.e., a cellular membrane comprising at least 15% voids. Unlike the tape of the Brochman patent, the cellular adhesive membrane of the product of the present invention, after being compressed ⅔ of its void thickness and released after 30 seconds, experiences a recovery above the line 10 on FIG. 1 of the drawing within 60 seconds after release. As indicated in FIG. 1, the compressed adhesive membrane tends to spring back to substantially its original thickness when it comprises up to about 45% voids, but to experience somewhat less recovery at lower densities.

By "voids thickness" is meant that portion of the thickness of the cellular adhesive membrane attributable to cellular voids. Useful products of the invention have been made with voids thicknesses ranging from about 18 to 65 percent of the membrane thickness. 15 to 85 percent should be a useful range. The less dense adhesive membranes can provide substantial adhesive thicknesses at very low cost. Greater adhesive thickness is often desirable because this tends to provide greater resistance to peel forces.

A pressure-sensitive adhesive tape of the invention demonstrated remarkably good adhesion on contact with rough surfaces.

Typical cellular pressure-sensitive adhesive membranes of the invention have remarkably good flexibility and conformability at sub-freezing temperatures.

The adhesive product of the present invention is preferably made by the steps of (1) frothing a composition which is polymerizable to a pressure-sensitive adhesive state,
(2) coating the froth onto a backing, and
(3) polymerizing the coated froth in situ to a pressure-sensitive adhesive state to provide a pressure-sensitive adhesive membrane having a cellular structure comprising at least 15% voids.

Instead, the composition can be coated onto the backing without first being frothed, and the cellular adhesive membrane obtained by simultaneously foaming and polymerizing the coating. To date, better uniformity of cell structure has been attained by the frothing process. Either process differs from that of the aforementioned Brochmann patent in that Brochman first makes a pressure-sensitive adhesive polymer and then foams it, whereas the cellular structure of the adhesive membrane of the present invention is created either before or during polymerization, preferably before polymerization, because this has made the cell formation easier to control and has resulted in better uniformity. While solvent is evolved in Brochman's process, the adhesive tape of the present invention can be made with virtually no evolution of volatile matter.

Frothing prior to polymerization is conveniently accomplished by whipping a gas into the polymerizable composition. After coating the frothed composition onto a backing, the polymerization may be initiated by ultraviolet radiation as taught in U.S. Pat. No. 4,181,752 (Martens et al.). Because air tends to quench photopolymerization, the frothing gas is preferably inert, such as nitrogen or carbon dioxide.

Since the viscosity of a mixture of polymerizable monomers tends to be too low to provide a coatable froth, the monomers may be partially polymerized prior to frothing to provide a composition having a viscosity in the range of about 1000 to 40,000 cps, conveniently by mixing a photoactive polymerization initiator with the monomers and exposing the mixture to ultraviolet radiation. Viscosities above 5000 cps tend to provide better cell uniformity, whereas viscosities below 15,000 cps are preferred for ease of handling. Instead of employing ultraviolet radiation, a heat-activatable polymerization initiator may be mixed with the monomers to provide a mixture which can be partially polymerized by heat to the desired viscosity prior to frothing. A third technique which has been successful is to mix the monomers with a thixotropic agent such as fumed silica, carrying out the entire polymerization in a single in situ step after coating.

If the monomer mixture has been photopolymerized to provide a froth of coatable viscosity, it may contain sufficient residual initiator to allow the coated froth to be fully polymerized under ultraviolet radiation. However, it is usually desirable to add further photoinitiator which may also be capable of crosslinking the polymer. If the monomers are partially polymerized thermally and the polymerization is to be completed in situ by heat, it is usually necessary to add additional heat-activatable polymerization initiator to the partially polymerized composition.

In situ polymerization can also be effected by electron beam as suggested in U.S. Pat. No. 4,243,500 (Glennon). See also U.S. Pat. No. 2,956,904 (Hendricks).

When the polymerization is to be effected by ultraviolet radiation, the polymerizable coating is preferably protected from air by a plastic film overlay which is fairly transparent to ultraviolet radiation and has a low-adhesion surface. Biaxially-oriented polyethylene terephthalate film which is about 75% transparent to ultraviolet radiation is very useful. If the underlying backing also has a low-adhesion surface, both the backing and the transparent plastic film can be stripped away so that the cellular adhesive membrane may be used for mounting objects. For such use, the cellular membrane may be reinforced by a tissue-like web to avoid becoming distorted if it is to be removed from both the backing and the transparent overlay before being applied. On the other hand, the polymerizable coating may be applied directly onto a molding, carpet, linoleum, metal foil, mechanical fastener, or any other object, and then polymerized.

If instead of covering the polymerizable coating, the polymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air.

When the polymerization is to be effected by ultraviolet radiation, the photopolymerizable composition preferably contains a crosslinking agent to enhance the cohesive strength of the resulting cellular membrane. Useful crosslinking agents which also function as photopolymerization initiators are disclosed in U.S. Pat. Nos. 4,330,590 (Vesley) and 4,329,384 (Vesley, Moon). Other suitable crosslinking agents include polyacrylic-functional monomers such a trimethylolpropane triacrylate and 1,2-ethylene glycol diacrylate.

Regardless of the process by which the cellular structure of the adhesive membrane is created, it is preferred to include a surfactant in the composition, preferably a silicone or a fluorochemical known to be useful for foaming organic liquids that have low surface tension. By doing so, tapes with cellular adhesive membranes of good uniformity have been produced wherein the cells have an average diameter within the range of 0.05 to 0.3 mm. Typically, 90% of the cells of the adhesive membrane vary in size no more than 2:1, but some of the adhesive membranes have been characterized by significant variations in cell size. Products of the invention have been produced with cells as small as 0.01 mm and, when no surfactant was used, as great as 2 mm in diameter. Cellular adhesive membranes of the invention have been as thin as 0.1 mm and as thick as 6.25 mm. Even thicker membranes can be produced if desired, particularly by ultraviolet irradiation of both faces.

It is not understood why some surfactants are more effective than others in producing a uniform cell structure, but those which have provided the best results are most effective when used in amounts ranging from 0.5 to 5% by weight of total solids. Either larger or smaller amounts might result in nonuniformity and appreciable numbers of cells exceeding the preferred maximum of 0.3 mm, as well as reduced internal strength.

The cellular pressure-sensitive adhesive membrane of the invention preferably comprises a polymer of 50–100 parts of substituted or unsubstituted alkyl acrylate or methacrylate monomers (all of which are hereinafter collectively referred to as "acrylate monomer") and 0–50 parts of copolymerizable monoethylenically-substituted monomer. Useful polymers are disclosed in U.S. Pat. No. Re. 24,906 (Ulrich), namely, copolymers of (1) 88–99 parts of alkyl acrylate having an average of 4–12 carbon atoms in their alkyl groups and (2) correspondingly, 12–1 parts of at least one of acrylic acid, methacrylic acid, itaconic acid, acrylamide, and methacrylamide. Other useful polar monoethylenically-unsaturated monomers which are copolymerizable with acrylate monomer include N-substituted acrylamides, acrylonitrile, methacrylonitrile, hydroxyalkyl acrylates, cyanoethyl acrylate, maleic anhydride, and N-vinyl-2-pyrrolidone, all of which result in pressure-sensitive adhesives which are tacky at ordinary room temperature when used with $C_{4-12}$ alkyl acrylate in amounts up to about 12 mol percent of the acrylate monomer, or up to about 50 mol percent when the copolymerizable monomer is mainly N-vinylpyrrolidone. Other copolymerizable monomers that should be useful include alkyl vinyl ethers, vinylidene chloride, styrene, and vinyltoluene.

Because the cellular pressure-sensitive adhesive membrane of the invention need not be tacky at room temperature if it becomes tacky upon heating, the alkyl acrylate may have an average of only 1–3 carbon atoms, and the acrylic acid and other copolymerizable monomers are useful at far larger proportions. Cellular pressure-sensitive adhesive membranes which become tacky when heated and are applied while tacky afford increased resistance to failures, both in shear and in peel, and hold better when exposed to elevated temperatures in use as compared to membranes which are tacky at ordinary room temperature. They may also provide improved resistance to failures at ordinary room temperature.

A cellular pressure-sensitive adhesive membrane which is not tacky at ordinary room temperature may be laminated to a relatively thin noncellular pressure-sensitive adhesive layer to provide an adhesive tape product which adheres upon contact at room temperature and yet has the high internal strength afforded by its nontacky cellular membrane. Among other procedures for making such a laminate is a process involving first coating onto a transparent backing a thin layer of unfrothed monomer or partially polymerized monomer mixture which is photopolymerizable to a pressure-sensitive adhesive state. This is overcoated with a thicker photopolymerizable froth which is then protected from air by a plastic film overlay, and the coatings are simultaneously subjected to ultraviolet radiation through the transparent backing. The noncellular adhesive layer of such a tape product may have a thickness of about 0.01 to 0.075 mm, but not more than ⅓ the thickness of the cellular membrane.

Even if the cellular adhesive membrane is tacky at ordinary room temperatures, a relatively thin noncellular pressure-sensitive adhesive surface layer may be employed if the objects to be joined require different adhesives. For example, no single adhesive may adhere well both to a certain automotive paint and to a certain plastic body side molding.

The cellular adhesive membrane of the invention may comprise a copolymer of an acrylate monomer and an acrylate-terminated oligomer such as acrylate-terminated polybutadiene. Such an adhesive membrane tends to be less tacky than are cellular adhesive membranes made from copolymers of the Ulrich patent. Tackiness can be enhanced by adding a tackifier resin prior to frothing.

In addition to acrylates, useful cellular pressure-sensitive adhesive membranes of the invention have been made by in situ polymerization of a frothed coating of a copolymerizable mixture of cycloaliphatic diepoxide and polyalkylene glycol which contained tackifying resin. Such copolymerizable mixtures are disclosed in U.S. Pat. No. 4,256,828 (Smith). Useful cellular pressure-sensitive adhesive membranes have also been made from polymerizable urethanes. Other materials which can be blended with the polymerizable composition prior to coating include reinforcing agents and other modifiers, some of which may copolymerize with the polymerizable composition or may polymerize independently.

Hollow glass microspheres having an average diameter of 10 to 200 micrometers can be blended into the polymerizable composition prior to coating, thus producing additional beneficial results as taught in U.S. Pat. No. 4,223,067 (Levens). The hollow spaces within the microsphere are not taken into account when calculating the voids of a cellular adhesive membrane of the present invention. A cellular adhesive membrane of the present invention comprising about 25% voids and 25% hollow glass microspheres by volume exhibited spongy physical characteristics very much like commercially available open-cell poly(ethylene/vinylacetate) foam. A cellular adhesive membrane of the present invention comprising 30-35% voids and no filler, but otherwise identical, was surprisingly less spongy.

Other useful filler materials include fibrous reinforcing strands, woven and nonwoven reinforcing fabrics, glass beads, plastic hollow microspheres and beads, viscosity-adjusting agents and pigments, all of which tend to enhance the internal strength of the cellular adhesive membrane. If the polymerization is to be effected by ultraviolet radiation, care should be exercised to select materials which allow the radiation to penetrate into the entire coating during the photopolymerization step.

The recovery test data shown by tiny circles in FIG. 1 were obtained by testing tapes of the invention including those of Examples 1-21 and 23-27 as reported below. In each case, the cellular adhesive membrane was compressed about ⅔ of its voids thickness and released after 30 seconds, and the percent recovery (%R) was determined 60 seconds after release. All of the circles lie above the curve 10.

Figure 2:
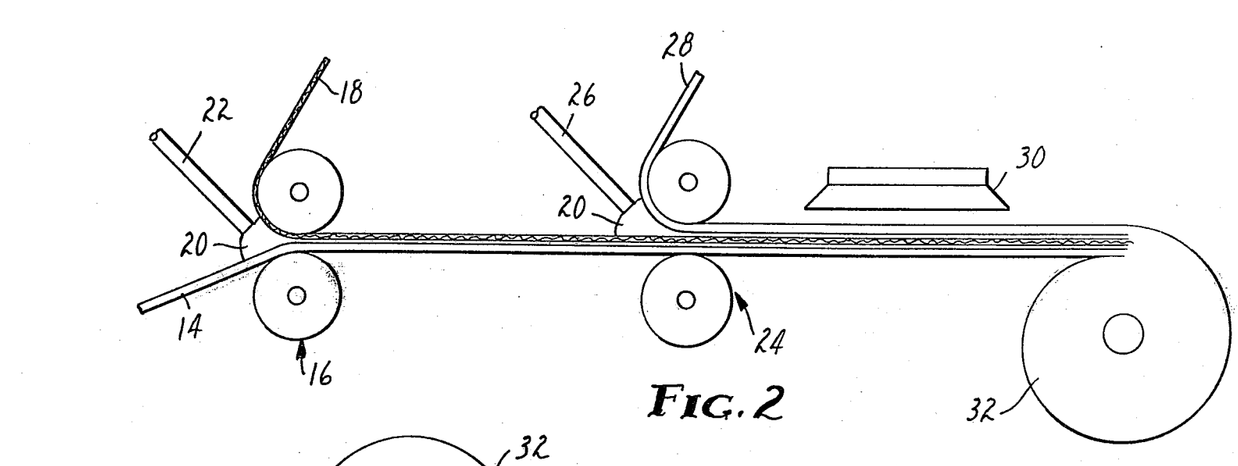
FIG. 2 schematically illustrates apparatus for making a pressure-sensitive tape product of the invention.

In FIG. 2, a flexible plastic film 14 which has low-adhesion surface is continuously fed into a roll coater 16 where it is joined by a tissue-like reinforcing web 18. A polymerizable froth 20 fed from a tube 22 into the nip of the roll coater 16 substantially saturates the web 18 as it passes through the roll coater 16. At a second roll coater 24, additional polymerizable froth 20 is added at the nip from a second tube 26, together with a transparent flexible plastic film 28 which has a low-adhesion surface. As the whole emerges from the second roll coater 24, the froth 20, while protected from air by the two plastic films 14 and 28, is exposed to ultraviolet radiation from a bank of lamps 30 to polymerize the froth to a pressure-sensitive adhesive state. The resultant tape product is wound upon itself to provide a roll 32. However, it is preferred to peel off one of the plastic films 14 or 28 before windup in order to avoid wrinkling, the remaining film serving as the backing.

Figure 3:
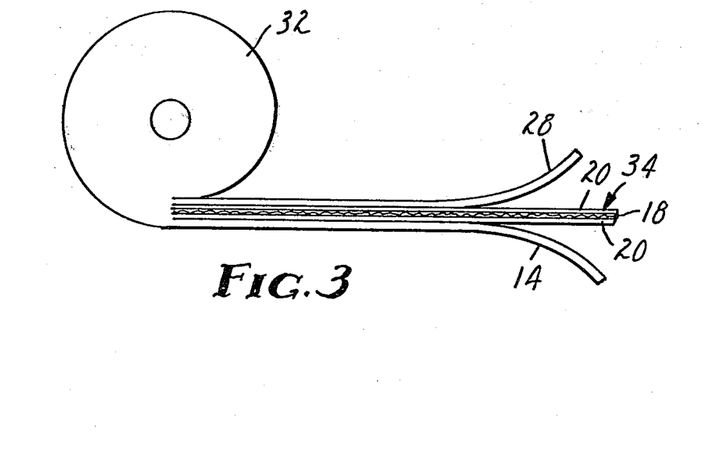
FIG. 3 is a schematic edge view of the tape produced on the apparatus of FIG. 2.

FIG. 3 shows the roll 32 being unwound and the two plastic films 14 and 28 being stripped away to present the reinforced cellular pressure-sensitive adhesive tape membrane 34 for application to a desired use.

TYPICAL TAPE-MAKING PROCEDURE

Into the mixture of photopolymerizable monomers was stirred 0.04% by weight of 2,2-dimethoxy-2-phenyl acetophenone (obtainable as "Irgacure" 651). This was partially polymerized to provide a syrup about 3000 cps in viscosity by exposure to ultraviolet radiation. To the syrup was added 0.10% by weight of additional "Irgacure" 651 plus surfactant and crosslinking agent. This was slowly mixed with an air motor, taking care not to cause any frothing. The mixture was transferred to a 90-mm frother operating at 900 rpm. While nitrogen gas was fed into the frother, the frothed syrup was delivered through 12.5-mm tubing to the nip of a roll coater between a pair of transparent, biaxially-oriented polyethylene terephthalate films, the facing surfaces of which had low-adhesion coatings. The tubing was partially constricted by a clamp to provide a desired pressure in the frother.

The composite emerging from the roll coater was irradiated with a bank of fluorescent black light bulbs (Sylvania F20T12BL), 90% of the emissions of which were between 300 and 400 nm with a maximum at 351 nm. The exposure was 900 mj as measured by an International Light "Light Bug" which is spectrally responsive between 250 and 430 nm, maximum 350 nm. The composite was cooled by blowing air against both films during the irradiation to keep the temperature of the films below 85° C. to avoid wrinkling of the films.

The uniformity, density, cell size, tensile strength and elongation of cellular adhesive membrane of the resultant tape were all affected by the selection and amount of surfactant, the nitrogen flow rate, and the pressure in the frother.

SHEAR VALUE

A cellular adhesive membrane is self-adhered to a rigid stainless steel plate and a rigid stainless steel panel with an exactly 1.27-cm square portion of the membrane in contact with the panel. Before testing, a 1000-g weight rests over the bonded area for 15 minutes. While the panel is tilted 2° from the vertical to insure against any peel forces, a 500-gram weight is immediately hung from the plate for testing at 20° C. When tested at 70° C., the panel with the adhered tape is placed in the oven for 15 minutes before hanging the weight. The time at which the weight falls is the Shear Value. If no failure, the test is usually discontinued at 10,000 minutes.

180° Peel

One inch (2.54 cm) wide tape comprising a biaxially-oriented polyethylene terephthalate backing 50 micrometers in thickness and a cellular adhesive membrane is self-adhered to a smooth stainless steel plate under the weight of a 2.04-kg hard rubber roller, 2 passes in each direction. After 15 minutes dwell, 180° Peel is measured by moving the free end of the tape away from the steel plate at a rate of about 0.5 cm per second (using an Instron tensile tester).

In the following examples, all parts are given by weight except as noted, and all of the tape products were agressively tacky at ordinary room temperature unless otherwise noted. Surfactants used were:

A = silicone resin in xylenes (Dow Corning DC-1250), 50% solids.
B = $C_8F_{17}SO_2N(C_2H_5)(C_2H_4O)_7CH_3$
C = solution of fluoroaliphatic oligomer of Example 2 of U.S. Pat. No. 3,787,351 in ethyl acetate, 50% solids.
D = solution of fluoroaliphatic oligomer of Example 3 of U.S. Pat. No. 3,787,351 in an aromatic solvent, 50% solids.
E = solution of 90 parts of a fluoroaliphatic copolymer (prepared as described in U.S. Pat. No. 3,787,351) of

| | Parts |
|---|---|
| $C_8F_{17}SO_2N(CH_3)C_4H_8OCOC(CH_3)=CH_2$ | 35 |
| $C_8F_{17}SO_2N(CH_3)C_2H_4OCOCH=CH_2$ | 35 |
| $CH_2=C(CH_3)COO(C_4H_8O)_{28}COC(CH_3)=CH_2$ | 20 |
| $C_4H_9OCOCH=CH_2$ | 10 | and 10 parts of a urethane-carbodiimide adduct (prepared as in Example 2 of U.S. Pat. No. 4,215,205) of 2 moles of $C_8F_{17}SO_2N(C_2H_5)C_2H_4OH$ and 3 moles $CH_3C_6H_3(NCO)_2$, 40% solids in a chlorinated organic solvent mixture.
F = fluoroaliphatic urethane adduct of 2 moles $C_8F_{17}SO_2N(C_2H_4OH)_2$, 3 moles $CH_3C_6H_3(NCO)_2$, and 1.5 moles poly(oxyalkylene)glycol ("Pluronic" L-44), prepared by the procedure of Example 1 of U.S. Pat. No. 4,289,892.
G = solution-suspension of a copolymeric fluoroaliphatic oligomer [of 70 parts N—methyl-perfluorooctanesulfonamidoethyl acrylate, 20 parts poly(oxytetramethylene)acrylate, and 10 parts butyl acrylate] in poly(oxypropylene)-triol of 1500 average molecular weight, 20% solids.
H = silicone resin (Union Carbide Y-6827).
I = copolymer of polydimethylsiloxane and poly(alkylene oxide) (Dow-Corning DC-190).

EXAMPLES 1-21

A series of 21 tape products of the invention was made by the above-described Typical Tape-making procedure under specific conditions as reported in Table I and tested as reported in Table II.

TABLE I

| Example No | Monomers Ratio | C-linker % | Surfactant | % solids | Pump cc/min | $N_2$ cc/min | Pressure kPa |
|---|---|---|---|---|---|---|---|
| 1 | IOA/AA 90/10 | HDDA 0.15 | C | 0.75 | 79 | 12.9 | 290 |
| 2 | " | " | D | 2.0 | 92.4 | 12.9 | 172 |
| 3 | " | " | D | 2.0 | 72.6 | 12.9 | 241 |
| 4 | " | " | D | 2.0 | 72.6 | 24.5 | 241 |
| 5 | " | " | D | 2.0 | 72.6 | 38.8 | 345 |
| 6 | " | " | D | 3.0 | 85.8 | 72 | 276 |
| 7 | " | " | D | 3.0 | 85.8 | 116 | 276 |
| 8 | " | " | F | 1.9 | 72.6 | 46.5 | 345 |
| 9 | " | " | A | 0.6 | 79 | 12.9 | 241 |
| 10 | " | " | E | 1.6 | 66 | 12.9 | 276 |
| 11 | " | " | C | 0.75 | 66 | 12.9 | 138 |
|  |  |  | B | 1.0 |  |  |  |
| 12* | " | none | C | 0.75 | 231 | 38.8 | 345 |
|  |  |  | B | 1.0 |  |  |  |
| 13* | " | none | C | 0.75 | 66 | 15.5 | 345 |
|  |  |  | B | 1.0 |  |  |  |
| 14 | IOA/NVP 70/30 | HDDA 0.15 | D | 2.0 | 132 | 15.5 | 241 |
| 15 | IOA/AA/BA 70/15/15 | " | D | 2.0 | 85.5 | 25.8 | 241 |
| 16 | IOA/AA/BA 55/25/20 | " | C | 0.75 | 72.6 | 11.6 | 276 |
| 17 | IOA | " | C | 0.75 | 85.5 | 22 | 207 |
|  |  |  | B | 1.0 |  |  |  |
| 18 | IOA/AA 70/30 | " | D | 2.0 | 79 | 15.5 | 276 |
| 19 | " | " | D | 2.0 | 70 | 33.6 | 276 |
| 10 | IOA/AA 90/10 | none | none | 85.8 | 26 | 341 |
| 21 | " | MPT 0.05 | C | 0.75 | 99 | 18 | 310 |

TABLE I-continued

| Example No | Monomers Ratio | C-linker % | Surfactant | % solids | Pump cc/min | N$_2$ cc/min | Pressure kPa |
|---|---|---|---|---|---|---|---|
| | | | B | 1.0 | | | |

*Examples 12 and 13 received exposure of 1200 mj because of their greater thickness; monomer mixture of Example 12 included 1.4% of a 20% solution of SnCl$_2$.2H$_2$O in polypropylene glycol of 425 average molecular weight.
IOA = isooctyl acrylate
AA = acrylic acid
BA = butyl acrylate
NVP = N—vinyl-2-pyrrolidone
HDDA = 1,6-hexanediol diacrylate

MPT =

TABLE II

| Example No | $T_o$ mm | Typical Cell Size mm | Recovery Test % V | % C | % R | 180° Peel N/dm | Shear Value (min.) at 20° C. | Shear Value (min.) at 70° C. |
|---|---|---|---|---|---|---|---|---|
| 1 | 1.0 | .1–.2 | 34 | 70 | 90 | 92.4 | 5860A | 487 |
| 2 | 1.25 | .05–.2 | 22 | 64 | 93 | | | |
| 3 | 1.2 | .08–.2 | 36 | 70 | 92 | 87.5 | | 10000+ |
| 4 | 1.05 | .05–.2 | 42 | 62 | 55 | | | |
| 5 | 0.9 | .1–.3 | 52 | 61 | 36 | | | 15 |
| 6 | 1.1 | .1–.3 | 58 | 63 | 47 | | | |
| 7 | 1.05 | .1–.5 | 66 | 66 | 56 | 52.5 | 10000+ | 155 |
| 8 | 1.05 | .02–.1 | 61 | 66 | 47 | | | 10000+ |
| 9 | 1.1 | .05–.2 | 31 | 64 | 94 | | | |
| 10 | 1.1 | .05–.1 | 42 | 66 | 84 | 63.4 | 10000+ | 925 |
| 11 | 0.15 | .05–.1 | 39 | 51 | 80 | | | 10000+ |
| 12 | 5.9 | .05–.4 | 38 | 63 | 98 | | | |
| 13 | 3.6 | .05–.5 | 38 | 66 | 89 | | | |
| 14 | 1.2 | .05–.2 | 38 | 64 | 91 | 73.8 | 10000+ | 48 |
| 15 | 1.4 | .1–.3 | 33 | 66 | 83 | 152 | | 10000+ |
| 16 | 1.3 | .05–.2 | 42 | 65 | 71 | 61.3* | 10000+ | 10000+ |
| 17 | 1.25 | .1–.4 | 30 | 67 | 95 | 96.3 | | 1A |
| 18 | 1.2 | .05–.2 | 38 | 64 | 84 | * | * | * |
| 19 | 1.2 | .05–.3 | 59 | 66 | 72 | * | | * |
| 20 | 1.0 | .2–1.6 | 30 | 67 | 95 | 145.5 | | 55 |
| 21 | 1.1 | .05–.2 | 38 | 65 | 73 | 30.6 | | 315A |

*Because the adhesive membrane was not tacky at room temperature, weights totaling 3000 g were placed over the contact area (110 g/cm$^2$) for 15 minutes at room temperature before testing the tape of Example 16; the tapes of Examples 18 and 19 did not adhere under those weights at room temperature; when the same weights were applied in an oven at 70° C. for 15 minutes, the 180° Peel of the tapes of Examples 16, 18 and 19 were 147.5, 68.4 and 45.9 N/decimeter, respectively. Shear Values for the tapes of Examples 18 and 19, tested after applying 310 g/cm$^2$ for 15 min. at 70° C., were 10,000+ minutes.
"A" following a Shear Value indicates adhesive failure. All other failures were cohesive.

The recovery test data reported in Table II was obtained by attempting to compress the cellular adhesive membrane ⅔ of its voids thickness. The actual percent compression is reported as "%C" and the percent recovery as "%R", obtained as follows:

$T_o$ = original thickness of adhesive membrane
$T_c$ = compressed thickness
$T_r$ = thickness 60 seconds after release following compression at $T_c$ for 30 seconds
$V$ = voids in adhesive membrane obtained from $$\frac{d_u - d_f}{d_u}$$ where $d_u$ is the unfoamed density and $d_f$ is the foamed density.

$$\% C = \frac{T_o - T_c}{VT_o} \times 100$$

$$\% R = \frac{T_r - T_c}{T_o - T_c} \times 100$$

Some of the cellular adhesive membranes were tested for tensile strength (ASTM D-412-80 using standard dumbbell Die C) with the following results:

TABLE III

| Example No. | Tensile (kPa) | Elongation % |
|---|---|---|
| 1 | 283 | 850 |
| 3 | 427 | 825 |
| 4 | 248 | 775 |
| 5 | 165 | 700 |
| 7 | 103 | 575 |
| 10 | 469 | 750 |
| 14 | 400 | 650 |
| 15 | 345 | 600 |
| 16 | 1406 | 325 |
| 17 | 365 | 725 |
| 18 | 3696 | 150 |
| 19 | 1378 | 10 |
| 20 | 214 | 725 |
| 21 | 234 | 1000 |

EXAMPLE 22

Pieces of the polyester-backed cellular adhesive membrane of Example 1 of at least 2.5 cm square were compressed under a one-cm-diameter foot to the indicated %C for 30 seconds, and the %R was determined one minute after release with the following results:

| % C | % R |
|---|---|
| 116 | 75 |
| 160 | 73 |
| 225 | 68 |

These values indicate the remarkable ability of the cellular adhesive membrane of a typical tape product of the invention to recover from severe compression for a short period of time. In each case further recovery was experienced during the next few hours.

When an adhesive membrane of the present invention is being observed under a microscope while under compression, the individual cells become smaller and eventually disappear under increasing very high pressures. Upon release of the pressure, cells immediately reappear having the same size as originally, but in much smaller numbers. After standing overnight, there are more cells having a larger average size than originally.

From this it is deduced that the gas in the cells is being dissolved in the adhesive polymer under compression.

EXAMPLE 23

A tape was made as in Example 1 except that the weight ratio of the isooctyl acrylate and acrylic acid monomers was 81/19 and these monomers were partially polymerized to a coatable syrup by thermal, rather than ultraviolet, means and no crosslinker was added to the syrup. The cellular pressure-sensitive adhesive membrane of the resultant tape produce comprised 44% voids, had a thickness of 0.68 mm, and experienced a recovery (%R) of 88% from a compression (%C) of 68%. The cellular membrane was sufficiently tacky to form adequate adhesive bonds at ordinary room temperature, although somewhat stronger initial bonding strength could be attained by heating the membrane before application.

EXAMPLE 24

A tape was made as in Example 1 except that the cellular adhesive membrane incorporated a tissue-like reinforcing scrim of intermingled polyester fibers (duPont Paper Synthetic Spunbonded polyester 0.6 oz, 2006 Reemay, 3 mils thickness). The apparatus used was similar to that shown in FIG. 2 except that there was no bank of froth at the second roll coater 24, and the plastic film 28 was peeled off and discarded before the composite was wound up. The initial thickness of the scrim was about 0.075 mm, and the thickness of the cellular pressure-sensitive adhesive membrane including the scrim was 1.1 mm. The cellular membrane comprised 36% voids, had 90%R from 66%C, 180° Peel of 89.7 N/dm and a Shear Value at 70° C. of more than 10,000 minutes.

EXAMPLE 24A

The cellular membrane of a tape made as described in Example 24 comprised 25% voids, had a thickness of 1.2 mm, 88% R from 73% C, 180° Peel of 52.5 N/dm, and a Shear Value at 70° C. of more than 10,000 minutes. The tape was tested for adhesion as in the "180° Peel" test described below except at 90° peel after one hour dwell and using cold-rolled steel plates, one smooth and one knurled. The ratio of the peel values from the knurled plate to the smooth plate was 0.97.

COMPARATIVE EXAMPLE 24B

A pressure-sensitive adhesive tape was made by photopolymerization to have a noncellular layer of the same chemical composition as that of the cellular membrane of Example 24A. Four of these noncellular layers were laminated to each other to provide a total thickness of 1.0 mm, approximating that of the cellular membrane of Example 24A. When tested for 90° peel as in Example 24A, the ratio of the peel values from the knurled plate to the smooth plate was 0.39.

EXAMPLE 25

A tape was made as in Example 1 except that added to the partially polymerized syrup were glass microbubbles having a specific gravity of 0.07 (measured in bulktrue value 0.11) and a diameter of 20-150 micrometers (average 55 micrometers). The resultant cellular pressure-sensitive adhesive membrane had a thickness of 1.0 mm and comprised 25% voids. The glass microbubbles occupied 7% by weight of the membrane which had 86%R from 70%C. 180° Peel was 74.4 N/dm and Shear Value at 70° C. was over 10,000 minutes. The tape of this example showed greater compressibility under a given pressure than did tapes of the preceding examples. A piece of tape one inch (2.54 cm) square subjected to 34 kPa/cm² on an oversize platen was compressed to 87.5% of its original thickness, whereas the tape of Example 24 was compressed to 91.5% of its original thickness.

EXAMPLE 26

A tape was made as in Example 25 except that the monomers were 70 parts of isooctyl acrylate and 30 parts of N-vinyl-2-pyrrolidone. The resultant cellular pressure-sensitive adhesive membrane had a thickness of 1.0 mm and comprised 25% voids. The glass microbubbles occupied 25% by volume (7% by weight) of the membrane which had 85%R from 65%C. 180° Peel was 61.3 N/dm and Shear Value at 70° C. was over 10,000 minutes.

EXAMPLE 27

Into 20 parts of cyclohexylacrylate and 20 parts of butyl acrylate was dissolved 40 parts of pentaerythritol exter of highly stabilized rosin (Hercules "Foral" 85). One part of a plasticizing oil ("Shellflex" 371N), 0.5 part of "Irgacure" 651, and 15 parts of vinyl-terminated copolymer of butadiene and acrylonitrile ("Hycar" VTBN 1300×23) were mixed in, followed by 2 parts (1 part solids) of Surfactant C, 0.5 part of Surfactant B, and 2 parts of a 20% solution of $SnCl_2.2H_2O$ in polypropylene glycol of 425 average molecular weight. The resulting syrup of coatable viscosity was frothed in air manually, coated between a pair of plastic films, and irradiated with ultraviolet radiation. The resultant pressure-sensitive adhesive membrane was quite tacky, comprised 30% voids and experienced a recovery (%R) of 98% from a compression (%C) of 65%.

EXAMPLE 28

An oligomer, made by reacting isophorone diisocyanate and a polyester made from adipic acid, neopentyl glycol and 1,6-hexanediol ("Lexorez" 1400-12) was end-capped by reaction with methacrylic acid. 40 g of this methacrylate-end-capped urethane-polyester oligomer was mixed with 40 g isooctyl acrylate, 1.5 g (0.75 part solids) Surfactant C, 0.5 g Surfactant B, 0.08 g photoinitiator ("Irgacure" 651) and 0.4 g stannous octoate. The mixture was frothed in air by vigorous stirring with a tongue depressor, coated between plastic films, and irradiated with ultraviolet radiation to provide a moderately tacky pressure-sensitive adhesive tape having a cellular adhesive membrane.

EXAMPLE 29

A tape was made as in Example 1 except that 0.05% benzoyl peroxide was added to the coatable froth instead of the HDDA crosslinker, and the coated syrup was thermally cured in an oven at 83° C. instead of being irradiated. The resultant tape product had a cellular pressure-sensitive adhesive membrane which had a thickness of 1.1 mm, comprised 36% voids, and had 80%R from 62%C.

EXAMPLE 30

A tape was made as in Example 1 except that the monomer composition was not partially polymerized prior to frothing. Instead 3% by weight of a thixotropic agent, fumed silica, was included in the monomer composition, so that its viscosity was increased to a coatable condition prior to frothing. Also, the amount of Surfactant B was only 0.7%. The resultant cellular pressure-sensitive adhesive membrane was 1.15 mm thick, comprised 38% voids, and had 82%R from 64%C.

EXAMPLE 31

To 100 parts of a syrup of partially polymerized isooctyl acrylate (90 parts) and acrylic acid (10 parts) were added 0.10 part "Irgacure" 651, 0.5 part stannous octoate, 0.5 part fumed silica, 1 part (0.2 part solids) of Surfactant G, 2 Surfactant H, and 4 parts CFCl$_3$ ("Freon" 11). This was coated between plastic films and polymerized by ultraviolet irradiation (GE F15T8/BLB lamps). The cellular pressure-sensitive adhesive product was 0.63 mm thick, comprised 34% voids, and had 83%R from 73%C.

EXAMPLE 32

98 parts of isooctyl acrylate and 2 parts of acrylic acid were partially copolymerized thermally to a syrup of coatable viscosity. To the syrup was added 0.1% "Irgacure" 651, 3.4% fumed silica and 0.67% azobisisobutylnitrile as a blowing agent. This was coated between plastic films and exposed to ultraviolet radiation as in Example 1. The exotherm of the polymerization raised the temperature of the coating to about 105° C., thus decomposing the blowing agent to provide a cellular pressure-sensitive adhesive layer having a thickness of 2.15 mm, 34% voids, and 93%R from a 68%C.

EXAMPLE 33

A syrup of coatable viscosity was made under nitrogen by ultraviolet irradiation of a solution of 100 parts of 2-ethylhexyl methacrylate, 0.25 part "Irgacure" 651 and 5 parts of a 20% solution of SnCl$_2$.2H$_2$O in polypropylene glycol of 425 average molecular weight. To the syrup was added an additional 2.5 parts of the SnCl$_2$ solution and 5 parts (2.5 parts solids) of Surfactant D. This was frothed in air manually, coated between plastic films and exposed to ultraviolet radiation to provide a cellular pressure-sensitive adhesive membrane having a thickness of 2 mm, 16% voids, and 86%R from 64%C.

EXAMPLE 34

A syrup was made as in Example 33 except that the methacrylate was replaced by a mixture of isooctyl acrylate/acrylic acid/butyl methacrylate (67/12/21). To the syrup was added 2 parts (1 part solids) of Surfactant C and 0.5 part Surfactant B. This was frothed in air manually, coated between plastic films and irradiated to provide a cellular pressure-sensitive adhesive membrane having a thickness of 1.08 mm, 19% voids, and 90%R from 62%C. Although slightly less tacky than that of Example 33, the adhesive membrane was aggressively tacky and exhibited extraordinarily good toughness.

EXAMPLE 35

Into 100 parts of partially polymerized isooctyl acrylate/acrylic acid (90/10) of coatable viscosity was rapidly mixed 3.6 parts sodium borohydride. The mixing was accompanied by rapid evolution of a gas, causing the syrup to foam. The foamed syrup was coated between two plastic films and photopolymerized. The resulting cellular adhesive membrane had a thickness of 1.65 mm, 47% voids, and 81%R from 68%C.

EXAMPLE 36

| | Parts |
|---|---|
| Premixture of 28.14 parts of poly(oxypropylene) diol of 2000 average molecular weight, 22.87 parts of poly(oxypropylene) triol of 1500 average molecular weight, 43.14 parts of kaolin clay (Huber "Hi-White"), 3.79 parts of a color paste of pigments dispersed in an equal amount of poly(oxypropylene) diol of 2000 average molecular weight to give a dark brown color, 0.37 part of butylated hydroxytoluene as antioxidant, 0.28 part of calcuim 2-ethyl-hexanoate as a process stabilizer, 0.1 part ultraviolet stabilizer, and 1.33 parts of a paste of phenylmercuric acetate in an equal amount of poly(oxypropylene) diol of 2000 average molecular weight | 100.0 |
| Surfactant I | 0.5 |
| Isocyanate prepolymer prepared from 66.1 parts of tolylene diisocyanate, 17.73 parts of poly(oxypropylene) diol of 2000 average molecular weight and 16.17 parts of tripropylene glycol | 10.2 |
| CCl$_3$F blowing agent ("Freon" 11) | 14.0 |

A mixture of the above four ingredients was stirred vigorously in air for about 75 seconds and then coated between plastic films to a thickness of about 0.5 mm. After 30 minutes in an oven at 70° C., a moderately tacky cellular pressure-sensitive adhesive membrane was obtained having a thickness of 1.2 mm, 54% voids, and 88%R from 65%C. Its cellular structure was not as uniform as were those obtained by frothing prior to coating.

EXAMPLE 37

A mixture was prepared as in Example 36 except that 4 parts of Surfactant H was used instead of 0.5 part of Surfactant I, and no CCl$_3$F was used. After whipping vigorously in a kitchen mixer (two beaters) for 1.5 minutes, this mixture was coated between plastic films to a thickness of about 1.0 mm and placed in an oven at about 70° C. for 10 minutes. The resulting cellular pressure-sensitive adhesive membrane had a thickness of 1.2 mm, 29% voids and 90%R from 71%C.

EXAMPLE 38

Twenty-five parts of a tackifying resin [pentaerythritol ester of highly stabilized rosin ("Foral" 85)] was dissolved in 25 parts of epoxy cyclohexyl methyl epoxy cyclohexane carboxylate (Union Carbide ERL-4221) and 8.3 parts of polyethylene glycol of 600 average molecular weight. To this solution was added 2 parts (1 part solids) of Surfactant C, 0.5 part of Surfactant B, 2 parts of a plasticizing oil ("Shellflex" 371N) and 2 parts of triphenylsulfonium hexafluorophosphate. The mixture was frothed in air, coated between plastic films and irradiated with ultraviolet light to produce a slightly tacky pressure-sensitive adhesive tape having a cellular membrane comprising 49% voids, and exhibiting 71%R from 65%C.

EXAMPLE 39

After peeling off one of its transparent films to expose the cellular membrane of Example 18, a noncellular pressure-sensitive adhesive transfer tape was laminated to the cellular membrane using a hard rubber roller. The transfer tape was a copolymer of 90 parts isooctyl acrylate and 10 parts acrylic acid which had been polymerized by ultraviolet radiation with a crosslinking agent as disclosed in U.S. Pat. No. 4,330,590. Its thickness was 0.05 mm. Another piece of the same transfer tape was then laminated in the same way to the other face of the cellular membrane. This 3-layer tape product was tested for 180° Peel except it was provided for testing with a filament-reinforced backing. The peel value was 186 N/dm.

ROLL STABILITY

The cellular pressure-sensitive adhesive membrane of Example 1 was transferred to the face of a polyethylene film which had an adhesive-promoting primer coating. After being slit to widths of 2.54 cm, 45.7 meter lengths were wound onto cores of 7.6 cm diameter. Two of these rolls were stored at ordinary room temperature for 6 months, one lying flat against a hard surface and the other supported through its core by a horizontal rod.

The roll which was stored flat was dimensionally unchanged, but the radial thickness measured upwardly on the roll stored on the horizontal rod was 8% smaller than prior to storage while its radial thickness measured downwardly was unchanged. Strips of the adhesive membrane taken from each roll after storage were unchanged in appearance and exhibited the same properties as are reported in Table I for the freshly prepared membrane.

We claim:

1. Pressure-sensitive adhesive product comprising a cellular pressure-sensitive adhesive membrane surrounding and thereby defining a multiplicity of small voids, contituting from 15% to 85% of the volume of said membrane, the cellular adhesive membrane, when compressed $\frac{2}{3}$ of its void thickness and released after 30 seconds, being characterized by the feature that it experiences a recovery above the line 10 on FIG. 1 of the drawing within 60 seconds after release.

2. Pressure-sensitive adhesive product as defined in claim 1 wherein the pressure-sensitive adhesive layer is tacky at ordinary room temperature.

3. Pressure-sensitive adhesive product as defined in claim 1 wherein the pressure-sensitive adhesive layer is non-tacky at room temperature but becomes tacky when heated.

4. Pressure-sensitive adhesive product as defined in claims 1, 2 or 3 wherein the average diameter of the cells of the cellular membrane does not exceed 0.3 mm.

5. Pressure-sensitive adhesive product as defined in claim 1 wherein the backing is flexible and has a low-adhesion surface from which the cellular membrane is readily removable.

6. Pressure-sensitive adhesive product as defined in claims 1, 2 or 3 wherein said pressure-sensitive adhesive polymer is a polymer of at least one acrylate monomer.

7. A laminate of a pressure-sensitive adhesive product as defined in claim 1 and a noncellular adhesive layer of not more than ⅓ the thickness of the cellular membrane.

8. Pressure-sensitive adhesive product as defined in claim 1 wherein said pressure-sensitive adhesive comprises a polymer of 50-100 parts of substituted or unsubstituted acrylate monomer and corresponding 50-0 parts of copolymerizable monoethylenically substituted monomer.

9. Pressure-sensitive adhesive product as defined in claim 8 wherein said pressure-sensitive adhesive is a copolymer of monomers consisting essentially of (1) 88-99 parts of alkyl acrylate having an average of 4-12 carbon atoms in the alkyl groups and (2) correspondingly, 12-1 parts of at least one of acrylic acid, methacrylic acid, itaconic acid, acrylamide and methacrylamide.

10. Method of making a pressure-sensitive adhesive product comprising the steps of (1) preparing a composition which has a viscosity in the rage of about 1000 to 40,000 cps and is polymerizable to a pressure-sensitive adhesive state, (2) frothing the composition, (3) coating the froth onto a backing, and (4) polymerizing the coated forth in situ to a pressure-sensitive adhesive state to provide a pressure-sensitive adhesive membrane having a cellular structure comprising 15% to 85% voids and possessing a high degree of compression recovery.

11. Method as defined in claim 10 wherein said composition contains a photoinitiator and step (4) involves exposure to ultraviolet radiation.

12. Method of making a pressure-sensitive adhesive product comprising the steps of (1) preparing a composition which has a viscosity in the range of about 1000 to 40,000 cps and is polymerizable to a pressure-sensitive adhesive state, (2) coating the composition onto a backing, and (3) simultaneously foaming and polymerizing the coating in situ to a pressure-sensitive adhesive state to provide a pressure-sensitive adhesive membrane having a cellular structure comprising 15% to 85% voids and possessing a high degree of compression recovery.

13. Method as defined in claims 10 or 12 wherein a surfactant is included in the composition in an amount within the range from 0.5 to 5% by weight total solids.

14. Method as defined in claims 10 or 12 wherein the composition has a viscosity in the range of about 5,000 to 15,000 cps.

* * * * *

UNITED STATES PATENT AND TRADEMARK OFFICE
CERTIFICATE OF CORRECTION

PATENT NO. : 4,415,615

DATED : Nov. 15, 1983

INVENTOR(S) : Donald L. Esmay, Gordon G. Johnson & George F. Vesley

It is certified that error appears in the above—identified patent and that said Letters Patent is hereby corrected as shown below:

Column 8, Table I, Example 1 under heading Surfactant, there should be "B" under "C" and in "% Solids" column there should be "1.0" under "0.75"

Table I, Example 16, under column "Surfactant" under the "C" there should be "B" and under "% Solids" column under "0.75" there should be "1.0".

Table I, after "19" in the Example column, the "10" should be -- 20 --.

Column 9, line 51, "Table Ii" should be -- Table II --

Column 11, line 10, "produce" should be -- product --

Column 13, line 12, after "2" insert -- parts --

Column 15, line 11, "adhesive" should be -- adhesion --

Column 16, line 24, "rage" should be -- range --

Signed and Sealed this

Thirty-first Day of July 1984

[SEAL]

Attest:

GERALD J. MOSSINGHOFF

Attesting Officer

Commissioner of Patents and Trademarks